United States Patent [19]

Preston

[11] 4,422,600

[45] Dec. 27, 1983

[54] FISHING REEL

[76] Inventor: Robert Preston, 3081 N.W. 47th Ter., Apt. #307, Lauderdale Lakes, Fla. 33331

[21] Appl. No.: 423,703

[22] Filed: Sep. 27, 1982

Related U.S. Application Data

[63] Continuation-in-part of Ser. No. 265,683, May 20, 1981, abandoned.

[51] Int. Cl.$^3$ ............................................... A01K 89/02
[52] U.S. Cl. .................................... 242/217; 188/72.7; 188/72.9; 188/217; 192/14; 192/70.28; 192/93 A; 192/94; 254/346
[58] Field of Search ............................. 242/211–219, 242/84.5 R, 84.51 R, 84.1 R; 254/346, 378; 192/14, 70.28, 93, 94, 95; 188/72.7, 72.8, 72.9, 217

[56] References Cited

U.S. PATENT DOCUMENTS

| | | | |
|---|---|---|---|
| 2,298,481 | 10/1942 | Hayes | 242/219 |
| 2,476,437 | 7/1949 | Whisman | 242/217 |
| 2,984,433 | 5/1961 | Clark | 242/214 |
| 3,017,135 | 1/1962 | Wood, Jr. | 242/218 |
| 3,166,269 | 1/1965 | Veroli | 242/217 |
| 3,315,913 | 4/1967 | Grieten | 242/214 |
| 3,432,114 | 3/1969 | Meisner | 242/219 |
| 3,478,979 | 11/1969 | Henze | 242/219 |
| 3,697,012 | 10/1972 | Walker | 242/84.51 R |
| 3,806,060 | 4/1974 | Valentine | 242/84.51 R |
| 4,133,499 | 1/1979 | Purcell | 242/217 |

*Primary Examiner*—Billy S. Taylor
*Attorney, Agent, or Firm*—Jack E. Dominik

[57] ABSTRACT

This invention relates to a fishing reel which has free spooling, variable drag, and lock up action controlled by an exterior lever. The lever is cammed to a draw rod, which, in turn, through a floating contact, pins journalled through the reel housing, and a thrust bearing, urges a brake disk against a brake lining fixed to the spool. The floating contact is adjustable for presetting the maximum drag and provides smooth operation even under conditions of a warped brake disk or uneven brake lining. And use of approximately a dozen pressure pins, depending on reel size, avoids pressure warpage of the thrust bearing race and consequent binding during maximum drag operation. The brake disk, floating contact, journalled pins, and thrust bearing are located in a housing opposite that containing the lever, winding handle, and a second thrust bearing for the spool and thereby permit easy access for repair. The lever moves along a guidance strip which includes a stop for reliable presetting of and return to the maximum drag and a stop for low drag to avoid override and backlash which may occur upon free spooling.

4 Claims, 13 Drawing Figures

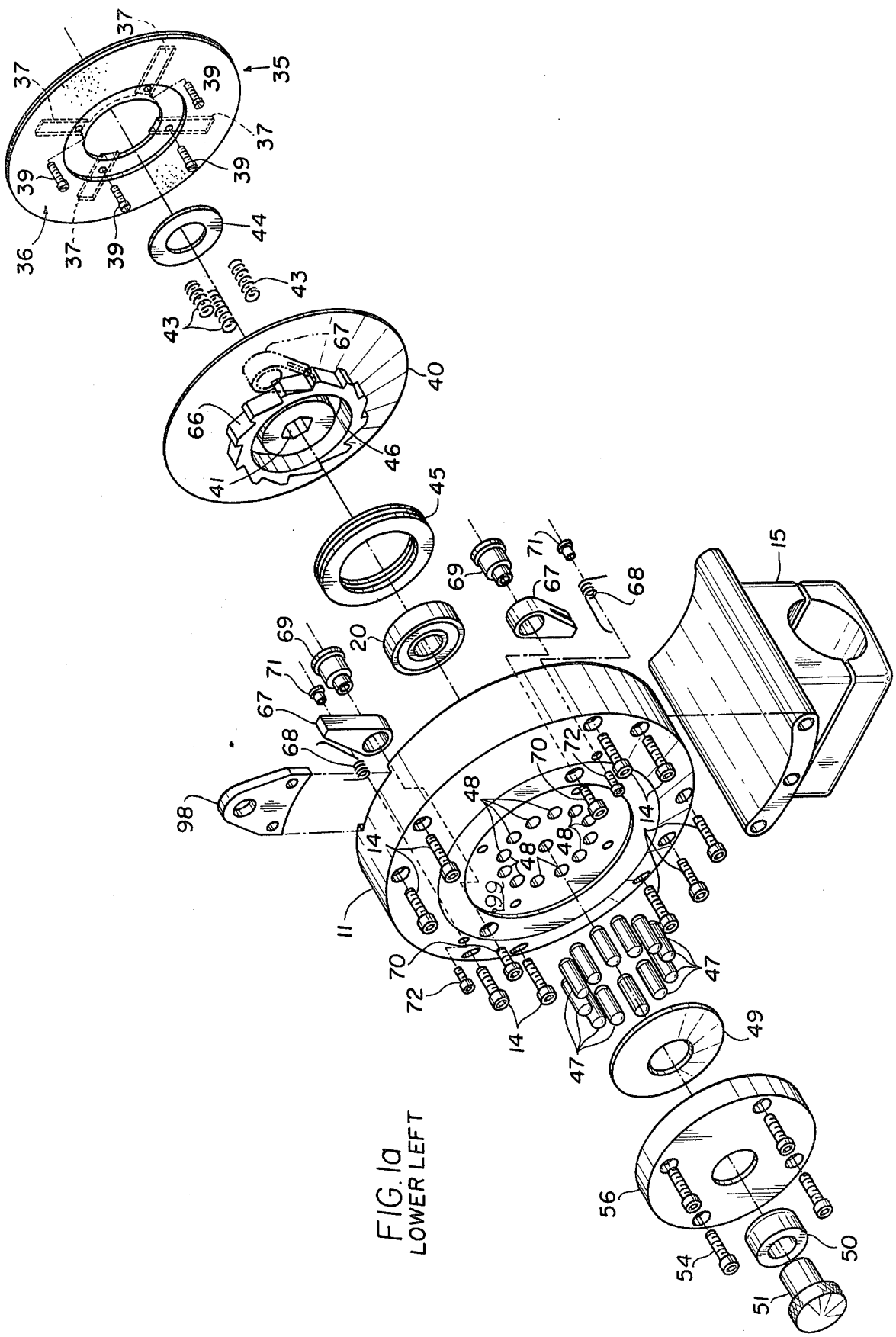

CENTER

UPPER RIGHT

FISHING REEL

CROSS-REFERENCE TO RELATED APPLICATION

This application is a continuation-in-part of applicant's copending application Ser. No. 265,683 filed May 20, 1981, now abandoned.

BACKGROUND OF THE INVENTION

1. Field of the Invention

This invention relates to fishing reels and more particularly to fishing reels with controlled drag.

2. Description of Prior Art

The prior art is extensive and includes the following U.S. Pat. Nos. 2,984,433 to Clark; 3,104,075 to Wood; 3,146,966 to Dunn; 3,425,644 to Griste; 3,497,155 to Mimeur; 3,697,012 to Walker; 3,799,472 to Svensson; 3,806,060 to Valentine; 3,966,140 to Coquelet; and 3,997,130 to Policansky. However, all of these prior art fishing reels suffer from unreliability and inconvenience of repair. The unreliability generally stems from the failure under stress when the braking friction (drag) is fully applied; and the inconvenience of repair generally stems from the relative placement and specialization of the numerous elements in the reel. Applicant's invention provides a fishing reel with both exceptional reliability and convenience of repair.

SUMMARY OF THE INVENTION

In accordance with the invention, a fishing reel is provided which has free spooling, variable drag, and lock up action controlled by an exterior lever. The lever is cammed to a draw rod, which, in turn, through a floating contact, pins journalled through the reel housing, and a thrust bearing, urges a brake disk against a brake lining fixed to the spool. The floating contact is adjustable for presetting the maximum drag and provides smooth operation even under conditions of a warped brake disk or uneven brake lining. And use of approximately a dozen pressure pins, depending on reel size, avoids pressure warpage of the thrust bearing race and consequent binding during maximum drag operation. The brake disk, floating contact, journalled pins, and thrust bearing are located in a housing opposite that containing the lever, winding handle, and a second thrust bearing for the spool and thereby permit easy access for repair. The lever moves along a guidance strip which includes a stop for reliable presetting of and return to the maximum drag and a stop for low drag to avoid override and backlash which may occur upon free spooling.

It is an object of the invention to provide a fishing reel with positive adjustable control of brake application, with a predetermined location for free spool action, with a predetermined and indicator arrangement for drag control, and in which the control structure is readily accessible.

It is a further object of the invention to provide a fishing reel with a manually accessible drag control lever movable to a positive location for free spooling, and within a predetermined range for drag control.

It is a further object of the invention to provide a fishing reel with a maximum drag preset adjustment which can compensate for drag brake wear and for replacement drag brake thickness differences easily and without the necessity of shims.

Other objects and advantageous features of the invention will be apparent from the description and claims.

BRIEF DESCRIPTION OF THE DRAWINGS

FIGS. 1a, 1b and 1c together form an exploded perspective of the first preferred embodiment; in FIG. 1b an auxiliary view of part 16 rotated 180° has been presented for clarity;

DESCRIPTION OF THE FIRST EMBODIMENT

Figure 1B:
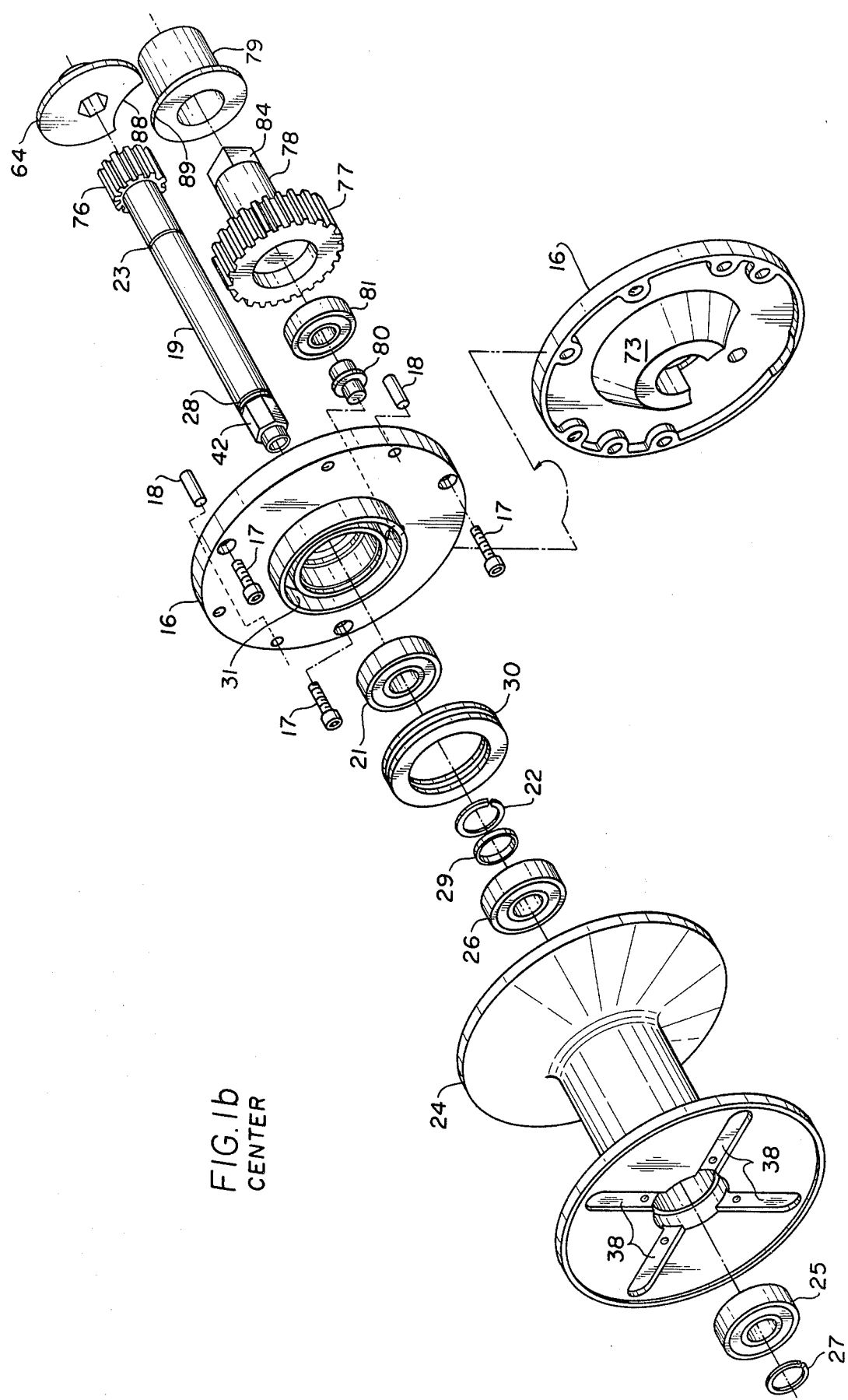
Figure 2:
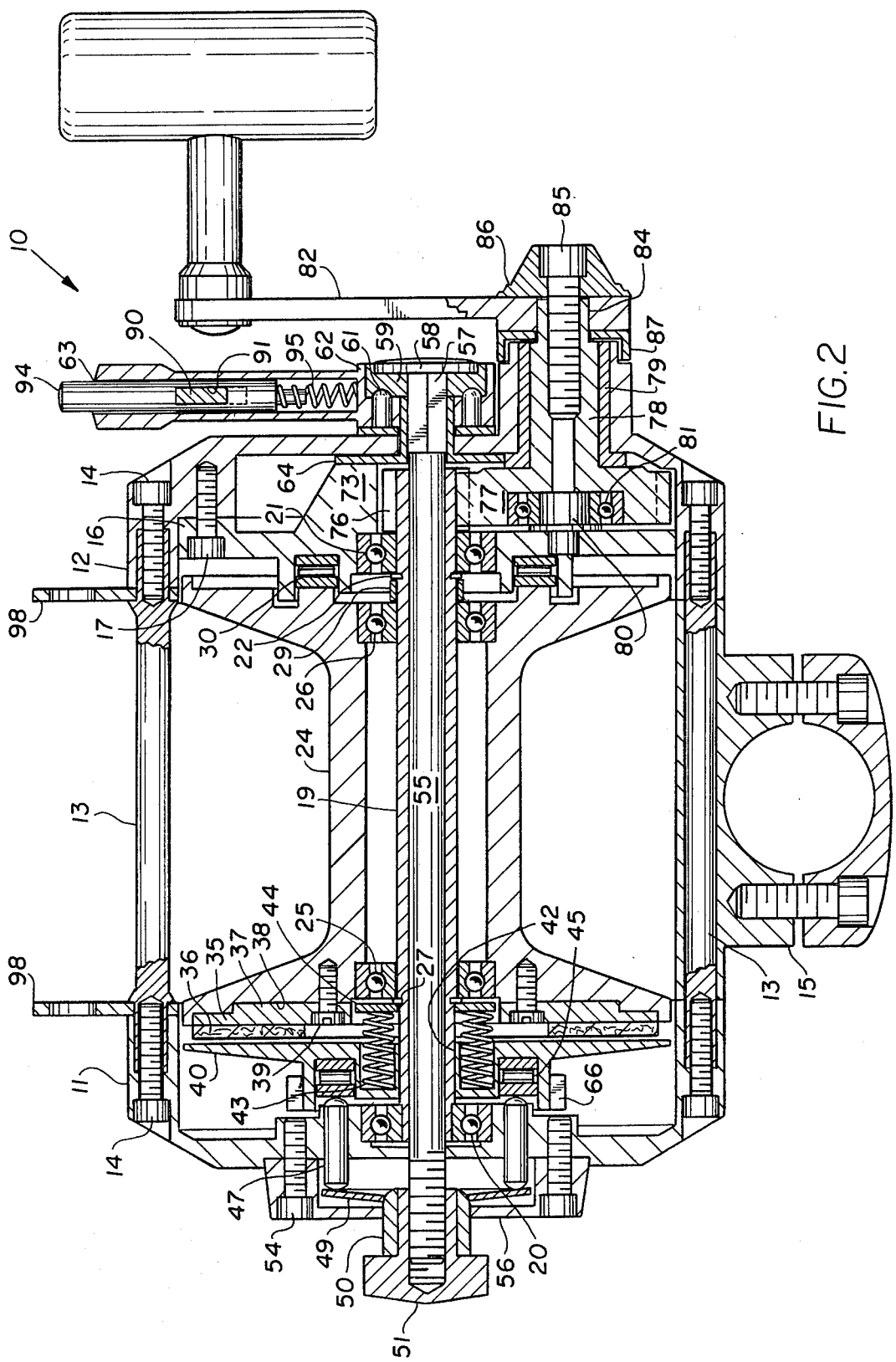
FIG. 2 is a cross-section in a plane which includes the axis of rotation of the spool.

Referring to the drawings, in which a first preferred embodiment of the fishing reel 10 is shown, end plates 11 and 12 are connected by spacer rods 13 and screws 14 of (one of which has been moved into the plane of the section in FIG. 2 to show details of construction), and a fishing rod holder 15 is carried by three of the spacer rods 13. End plate insert 16 (see FIG. 1b) is attached to end plate 12 by bolts 17 and locating dowels 18.

Hollow drive shaft 19 is supported by ballbearing 20, which is carried by end plate 11, and ballbearing 21, which is carried by end plate insert 16 and held by snap ring 22 fitting in groove 23 on drive shaft 19.

Spool 24 is mounted on ballbearings 25 and 26 which are carried by drive shaft 19; ballbearing 25 being held in place by snap ring 27 fitting in groove 28 on drive shaft 19 and spool 24; ballbearing 26 being held in place by spacer 29, snap ring 22 and spool 24. The fishing line wound on spool 24 is not shown. Spool thrust bearing 30 is carried in groove 31 on end plate insert 16 and provides an axial abutment for spool 24; consequently, a slight amount of play in the location of ballbearings 25 and 26 is desirable so that spool thrust bearing 30 may be unloaded during free spooling, as discussed later.

Figure 2A:
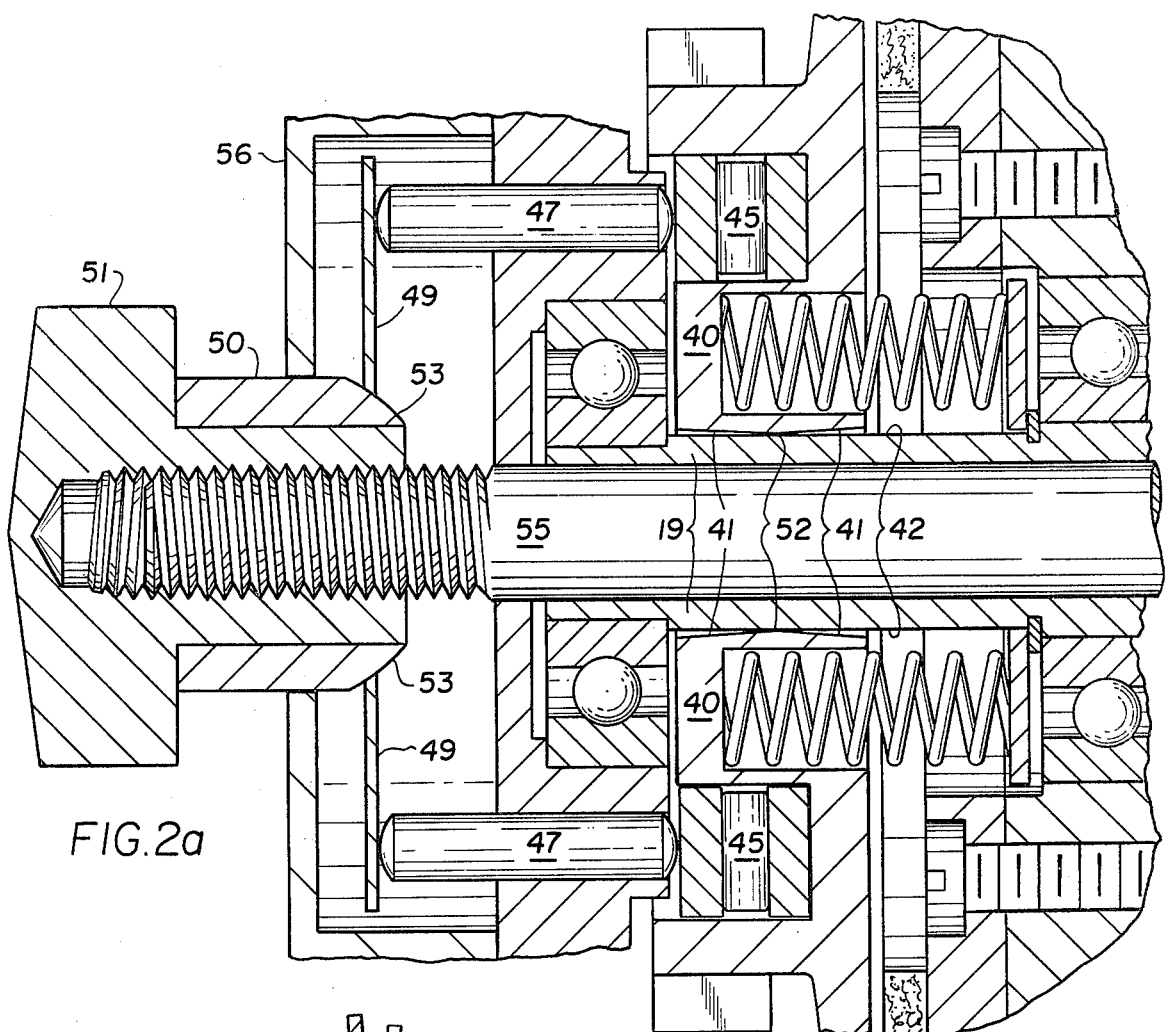
FIG. 2a is an enlarged view of the left hub area of FIG. 2.

Brake mounting plate 35 has a bonded band of asbestos brake lining 36 and four keys 37 which fit into corresponding slots 38 on spool 24; screws 39 secure brake mounting plate 35 to spool 24. Brake disk 40 has a hexagonal aperture 41 for slidable mounting on drive shaft 19 by engaging the hexagonal portion 42 at one end of the drive shaft. Aperture 41 is formed with walls very slightly converging (approximately 1° inwards) towards the longitudinal center of aperture 41; this is shown in detail in FIG. 2a. Brake disk 40 may thus tilt slightly out of the plane perpendicular to the longitudinal axis of drive shaft 19 and thereby maintain full contact during rotation with asbestos brake lining 36 even if brake disk 40 is warped or brake lining 36 unevenly worn. Springs 43 are disposed in cavities (not shown in FIG. 1a) in disk brake 40 and press against spring pressure washer 44 which is mounted on drive shaft 19 and held by snap ring 27. Thus springs 43 (FIG. 2 shows two of these springs in a vertical plane for simplicity) urge brake disk 40 axially away from brake lining 36.

Figure 2B:
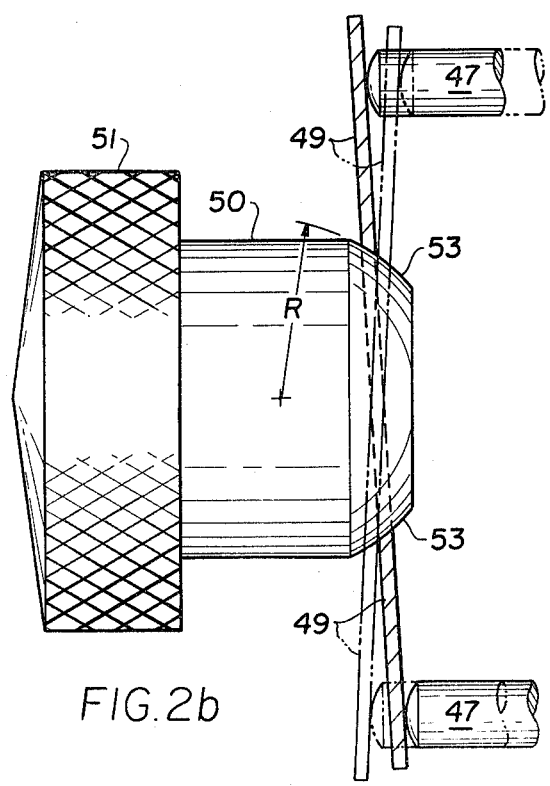
FIG. 2b is a detail of FIG. 2a showing the floating contact.

Brake thrust bearing 45 is carried in groove 46 of brake disk 40 and abuts one end of pressure pins 47 which are journalled in holes 48 of end plate 11. The opposed ends of pressure pins 47 (FIG. 2 shows only the uppermost and lowermost of twelve pins for simplicity) abut pressure disk spring 49 which is floatably held by pressure sleeve 50, pressure sleeve 50 having a spherical surface 53 for contact with a complementary surface on the central aperture of pressure disk spring 49 (see FIGS. 2a and 2b for cross-sectional detail). Pressure disk spring 49 may be flat (as in FIGS. 2a and 2b) or conical (as in FIGS. 1a and 2). Spherical surface 53 permits pressure disk spring 49 to tilt while maintaining full contact with pressure sleeve 50, as shown in FIG. 2b. Pressure sleeve 50 is held by pressure adjustment nut 51 which in turn is threaded onto the end of draw rod 55. Pressure sleeve 50 fits through a hole in cover 56, which is bolted by screws 54 to end plate 11 and covers pressure disk spring 49 and pressure pins 47. Spool thrust bearing 30 is of sufficient inside diameter to permit non-interfering location in a plane between the planes of ballbearings 21 and 26, and similarly brake thrust bearing 45 is in a plane between the planes of ballbearings 20 and 25. These size relations result in a compact reel. Thrust bearings 30 and 45 may be Torrington series NTA of appropriate sizes, as manufactured by the Torrington Company in Torrington, Connecticut.

Figure 1C:
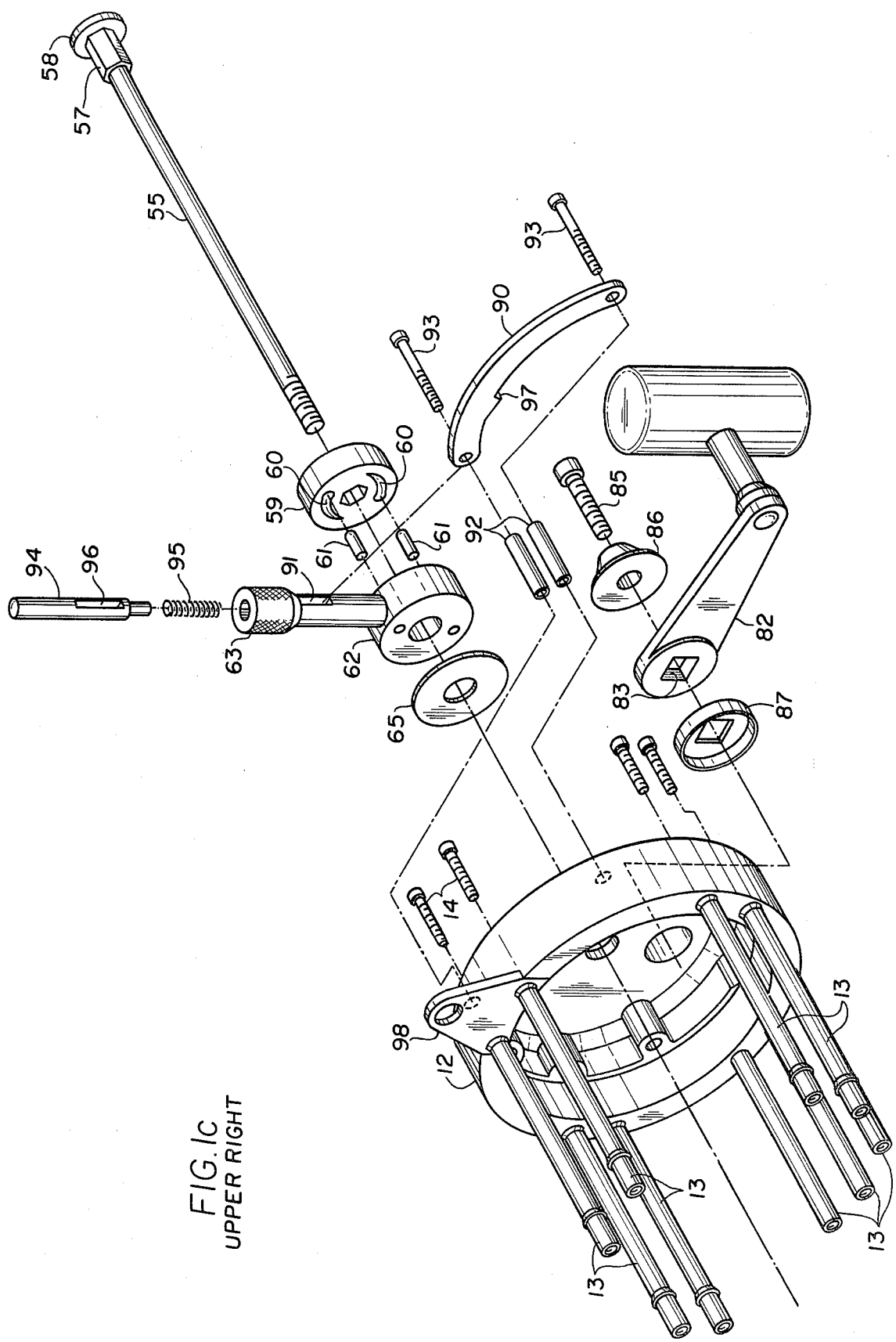

As shown in FIG. 1c draw rod 55 has a hexagonal end portion 57 and cap 58 at the end opposite from the threading which engages adjustment nut 51. Activating cam 59 has a hexagonal center aperture and fits on draw rod end portion 57 and abuts against cap 58. The activating cam 59 has two opposed tapered cam button grooves 60 which make cammed engagement with cam buttons 61 carried by pressure adjustment disk 62 to which is secured drag pressure adjustment lever 63. Cam buttons 61 extend through the pressure adjustment disk 62 and abut stop washer 65. Draw rod guide 64 fits into and extends beyond end plate 12. The extension carries stop washer 65 and rotatably carrying the pressure adjustment disk 62. Draw rod guide 64 has a hexagonal cross-sectional aperture which slidably engages the part of the hexagonal end portion 57 of draw rod 55 extending through activating cam 59 and prevents rotation of the draw rod. The portion of draw rod 55 extending beyond draw rod guide 64 passes through hollow drive shaft 19 and end plate 11 to engage nut 51. Thus hollow drive shaft 19 is free to rotate about draw rod 55. Draw rod guide 64 is held against end plate 12 by gear shroud 73 formed on end plate insert 16 and partially shrouding gear 76 (shroud 73 is visible in FIG. 1b in the auxiliary view of end plate insert 16).

Figure 3:
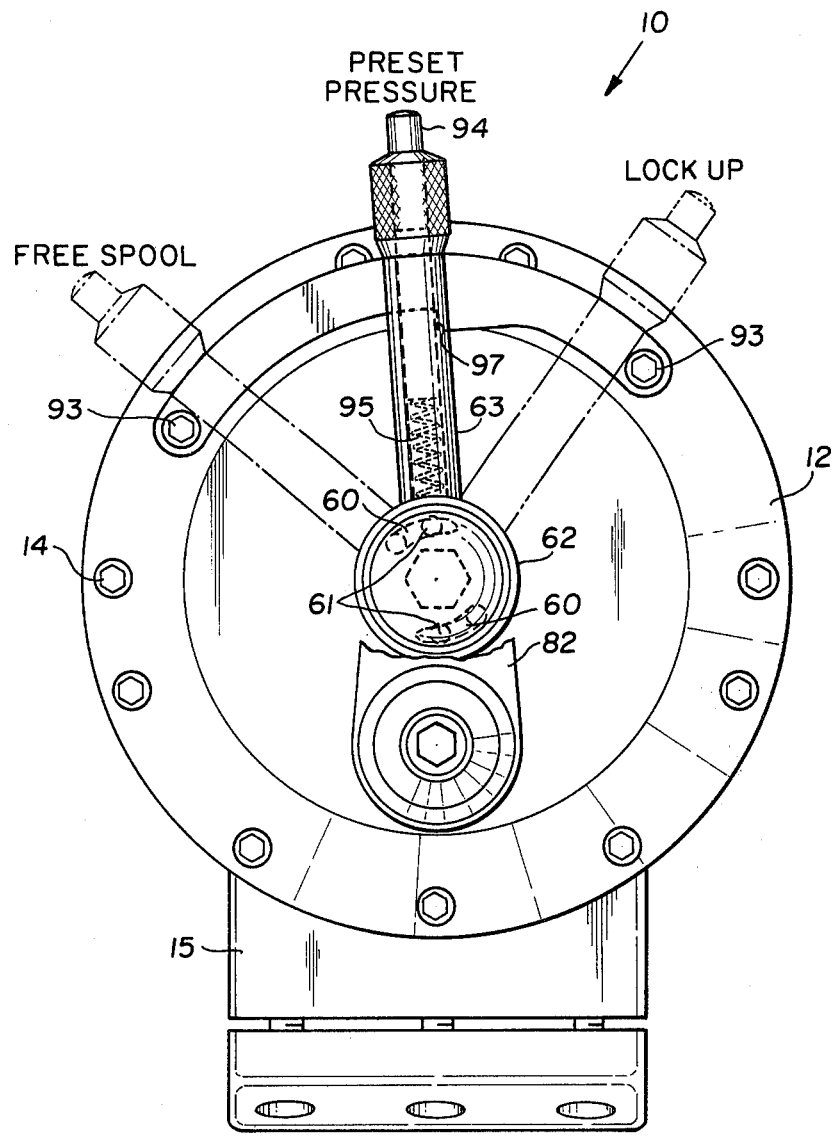
FIG. 3 is an end view looking along the axis of rotation from the end containing the drag control lever and winding handle.

The application of increased drag or lock-up proceeds when pressure adjustment lever 63 is rotated counterclockwise as seen in FIG. 1c (clockwise in FIG. 3). The cam buttons 61 are moved into the shallower portion of tapered cam button grooves 60 (shown in cross-section in FIGS. 4 to 4d) and thus urge activating cam 59, which abuts cap 58 and draw rod 55, away from pressure adjustment disk 62 which abuts stop washer 65 on end plate 12. Thus draw rod 55 is urged to the right relative to the end plates 11 and 12 in FIGS. 1a and 1c. This action urges adjustment nut 51 and pressure sleeve 50 against pressure disk spring 49 which in turn urge pressure pins 47 against brake thrust bearing 45 mounted in brake disk 40. A fairly large number of pressure pins 47 are used so as to spread out the force on thrust bearing 45 and avoid pressure warpage of the bearing race which would lead to binding of thrust bearing 45 during maximum drag operation. Since brake thrust bearing 45 bears against brake disk 40, it is urged to the right along hexagonal portion 42 of drive shaft 19 and against brake lining 36 which is affixed to mounting plate 35 and spool 24 (see FIGS. 1a and 1b). Thus the pressure of brake disk 40 against brake lining 36 is determined by the amount of rotation of pressure adjustment lever 63. The axial forces on spool 24 under drag are entirely opposed by thrust bearings 30 and 45 and none by any of the ballbearings. Thrust bearings 30 and 45 in effect form a vise holding spool 24 and brake disk 40; the vise connection is made through end plate insert 16 (shroud 73), guide 64, end plate 12, stop washer 65, cam buttons 61, activating cam 59, cap 58, draw rod 55, adjustment nut 51, pressure sleeve 50, pressure disk spring 49, and pressure pins 47. The body of the reel is thus unaffected by the stresses created when drag is applied. Also, pressure disk spring 49 absorbs shocks created by sudden pulls on the fishing line and spool 24. Because the sliding wear on the reel (other than the brake lining) resulting from applying drag is primarily at the contacts of the activating cam 59 with cam buttons 61 and the cam buttons 61 with stop washer 65, hardened surfaces for activating cam 59, cam buttons 61, and stop washer 65 are used.

Figure 4:
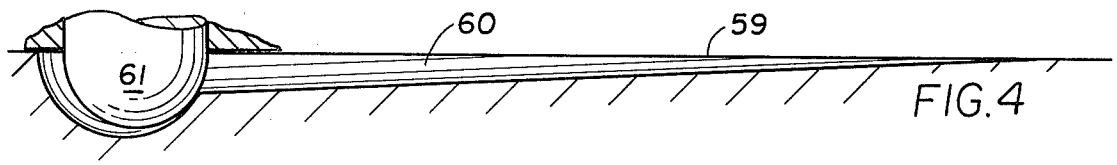
FIGS. 4—4d is a section per line 4—4 in FIG. 3a showing the detail of the cam action.
Figure 4A:
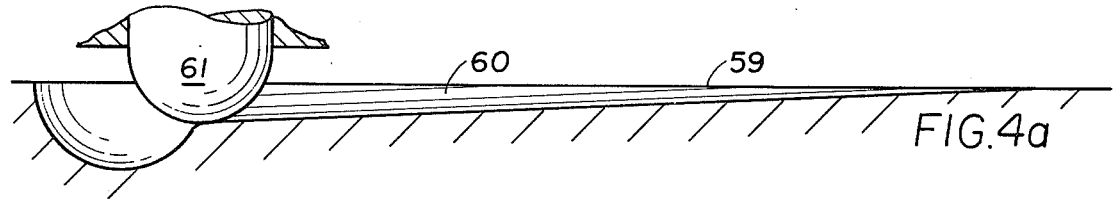

For free spooling pressure adjustment lever 63 is moved clockwise in FIG. 1c (counterclockwise in FIG. 3). This brings cam buttons 61 into the deepest portion of tapered cam button grooves 60 (FIG. 4 shows cross-sectional view) and permits springs 43 to urge brake disk 40, brake thrust bearing 45, pressure pins 47, pressure disk spring 49, pressure sleeve 50, adjustment nut 51, draw rod 55 and activating cam 59 to the left in FIGS. 1a and 1c, thereby disengaging brake disk 40 from brake lining 36. When brake disk 40 is disengaged from brake lining 36, spool 24 is free to rotate relative to shaft 19; conversely, when brake disk 40 is coupled with brake lining 36, spool 24 and drive shaft 19 are frictionally coupled, a slipping coupling for drag and a non-slipping coupling for lock-up. In all modes (free spool, drag, lock-up) draw rod 55 does not rotate and only communicates with spool 24 and drive shaft 19 through brake thrust bearing 45 and pressure pins 47 which are journalled in end plate 11.

Fishing reel 10 automatically compensates for uneven wear of brake lining 36 or misalignment or warping of brake mounting plate 35 or brake disk 40 without loss of efficiency or smoothness of operation as follows: the slight convergence of the walls of aperture 41 permits brake disk 40 to tilt into full contact with brake lining 36, this tilt is transmitted by thrust bearing 45 and pressure pins 47 to pressure disk spring 49 which takes on the same tilt by sliding on spherical surface 53 of pressure sleeve 50 (FIG. 2b). The ends of pressure pins 47 are rounded to facilitate smoothness in any sliding and tilting of the contacts of pressure pins 47 on thrust bearing 45 and on pressure disk spring 49 by insuring that the point of contact varies continuously. Because this tilt does not disturb the contact from pressure sleeve 50 to pressure disk spring 49 to pressure pins 47 to thrust bearing 45 to disk 40, the transmission of axial force from pressure sleeve 50 to brake disk 40 is angularly uniform. During drag applied rotation of spool 24 having an unevenly worn brake lining 36 or warped or misaligned brake mounting plate 35 or brake disk 40, the central axis of brake disk 40 precesses about the axis of spool 24 and causes pressure pins 47 to oscillate axially in a wave-like motion which, in turn, cause pressure disk spring 49 to axially precess on spherical surface 53 (FIG. 2b), but does not create substantial radial forces on pressure sleeve 50, adjustment nut 51, or draw rod 55.

Ratchet 66 is formed integrally with brake disk 40. Ratchet 66 engages ratchet pawls 67 which are mounted on end plate 11 and pressed against ratchet 66 by ratchet pawl springs 68. The ratchet action insures that brake disk 40 and drive shaft 19 rotate only in the clockwise direction in FIGS. 1a and 1b. Ratchet pawls 67 are mounted on end plate 11 by ratchet pawl holders 69 and bolts 70; ratchet pawl springs 68 are mounted on end plate 11 by ratchet pawl spring holders 71 and bolts 72.

Drive pinion 76 is integral with drive shaft 19 and engages handle drive gear 77 formed on handle drive shaft 78 which is mounted in oil-impregnated bronze bearing 79 pressed into end plate 12. Handle drive shaft bearing support 80 is pressed into end plate insert 16 and engages handle drive shaft ballbearing 81 carried by the assembly of handle drive gear 77 and handle drive shaft 78. Handle 82 has a square aperture 83 for engaging square end 84 of handle drive shaft 78 and is secured by screw 85 and washer 86 thereto. Dirt cover 87 also engages square end 84 and partially covers the exposed end of bearing 79. Thus handle 82 is positively geared to hollow drive shaft 19. Further, draw rod guide 64 has a flange recess 88 which engages flange 89 of bearing 79 preventing rotation of draw rod guide 64.

Pressure adjustment lever 63 rotates along pressure adjustment lever guide 90 which passes through guide slot 91 in pressure adjustment lever 63. Pressure adjustment lever guide 90 is mounted on end plate 12 by support sleeves 92 and screws 93. Pressure adjustment lever 63 is hollow and contains spring-loaded stop pin 94 and stop pin spring 95. The bottom of guide slot 96 in stop pin 94 bears against the bottom edge of guide 90, which passes through guide slots 91 and 96, under the compressive force of stop pin spring 95. The bottom edge of pressure adjustment lever guide 90 is provided with a ramp projection 97 for stopping counterclockwise rotation of pressure adjustment lever 63 (as seen in FIG. 1c; clockwise in FIG. 3), at approximately the mid-point of pressure adjustment lever guide 90. In FIG. 3 pressure adjustment lever 63 is shown at the position against projection 97. Thus if pressure adjustment lever 63 is in the right half of pressure adjustment lever guide 90 as seen in FIG. 1c (left half in FIG. 3), free spooling or drag occurs. When pressure adjustment lever 63 is rotated towards the left end (right end in FIG. 3) of pressure adjustment lever guide 90, it is stopped at projection 97. At this point, however, stop pin 94 may be manually depressed to overcome the compressive force of stop pin spring 95 and lower guide slot 96 so that pressure adjustment lever 63 may pass beyond projection 97 and thereby increase the braking and lock spool 24 to drive shaft 19. Conversely, if pressure adjustment lever 63 is in the left half of pressure adjustment lever guide 90, then a rotation of pressure adjustment lever 63 towards the right end of pressure adjustment lever guide 90 is unimpeded because stop pin 94 rides up and over the ramp side of projection 97, and the lock up is released.

The mode of operation may now be succinctly described with reference to FIGS. 1a, 1b and 1c. With pressure adjustment lever 63 rotated to the stopped position against projection 97, the maximum drag desired is set by manually adjusting adjustment nut 51. The extensive threading in adjustment nut 51 and on the end of draw rod 55 permits a wide range of maximum drag settings without the use of compensating shims, especially as the brake lining 36 is worn down or when brake mounting plate 35 and brake lining 36 are replaced with a necessarily different thickness.

During the play of a fish pressure adjustment lever 63 is manipulated in the right portion of pressure adjustment lever guide 90 which provides continuous variation of the drag from free spooling at the extreme right end of pressure adjustment lever guide 90 to the selected maximum drag at the stop position against projection 97.

After a fish is played out, pressure adjustment lever 63 is rotated to the extreme left portion of pressure adjustment lever guide 90 by depressing stop pin 94 to pass projection 97. This locks spool 24 to hollow drive shaft 19 and handle 82 for reeling in the fish, and ratchet 66 prevents any unwinding.

Harness rings 98 are secured to end plates 11 and 12, and provide means for attaching a harness to the fishing rod and reel.

A clicker (not shown in the FIGURES) is also provided to give an audible indication of spool 24 rotation.

To replace brake lining 36, adjustment nut 51 and end plate 11 are removed. Brake plate 40 then lifts off drive shaft 19, and brake mounting plate 35 is unbolted from spool 24 for replacement and reassembly. If brake mounting plate 35 and brake plate 40 are relatively out of alignment, then upon engagement brake plate 40 tends to align with mounting plate 35. This follows from the floating nature of the contact between pressure sleeve 50 and pressure disk spring 49 which is transmitted through pressure pins 47 and thrust bearing 45 to brake plate 40. Holes 99 provide for insertion of pins to hold ratchet pawls 67 against ratchet pawl springs 68 and permit easy reassembly.

To replace activating cam 59, cam buttons 61, and stop washer 65, adjustment nut 51 is removed and draw rod 55 pulled out. This gives access to activating cam 59. Removing one of the screws 93 and sleeves 92 permits pressure adjustment lever 63 to disengage pressure adjustment lever guide 90 and the extension of draw rod guide 64. This gives access to stop washer 65 and cam buttons 61 for removal and replacement.

Fishing reel 10 may be of various sizes to accommodate various fishing line test weights. In general, fishing line of a given test weight has a predetermined maximum usable length; and this translates into a spool size appropriate for that fishing line. Once the spool size is determined, then dimensions of the other elements of fishing reel 10 are determined. For example, twelve pound test line appropriately uses a spool of diameter 2.75 inches, fifty pound test line a spool of diameter 3.9 inches, and one hundred and thirty pound test line a spool of diameter 5.625 inches. For the fifty pound test line fishing reel, the following are appropriate dimensions for various elements:

| Item | Dimension (expressed in inches) | | | |
| --- | --- | --- | --- | --- |
| Thrust bearing 30 | 2.062 | O.D. | 1.375 | I.D. |
| Thrust bearing 45 | 1.750 | O.D. | 1.125 | I.D. |
| Ballbearings 21, 15, 26 | 1.1024 | O.D. | 0.4724 | I.D. |
| Ballbearing 20 | 1.0236 | O.D. | 0.3937 | I.D. |
| Spool 24 | 3.900 | O.D. | 3.125 | interior width |

-continued

| Item | Dimension (expressed in inches) | | |
|---|---|---|---|
| rive shaft 19 | 5.283 | length | |
| Draw rod 55 | 6.800 | length 0.750 | threaded |
| Pressure pins 47 | 0.750 | length 0.187 | diameter |
| Activating cam 59 | 1.060 | O.D. 0.543 | I.D. |
| Cam button 61 | 0.145 | projection from disk 62 | |
| Cam groove 60 | 0.175 | maximum depth (for free spooling) | |
| | 0.035 | maximum depth of linear portion | |

DESCRIPTION OF THE SECOND EMBODIMENT

Figure 3A:
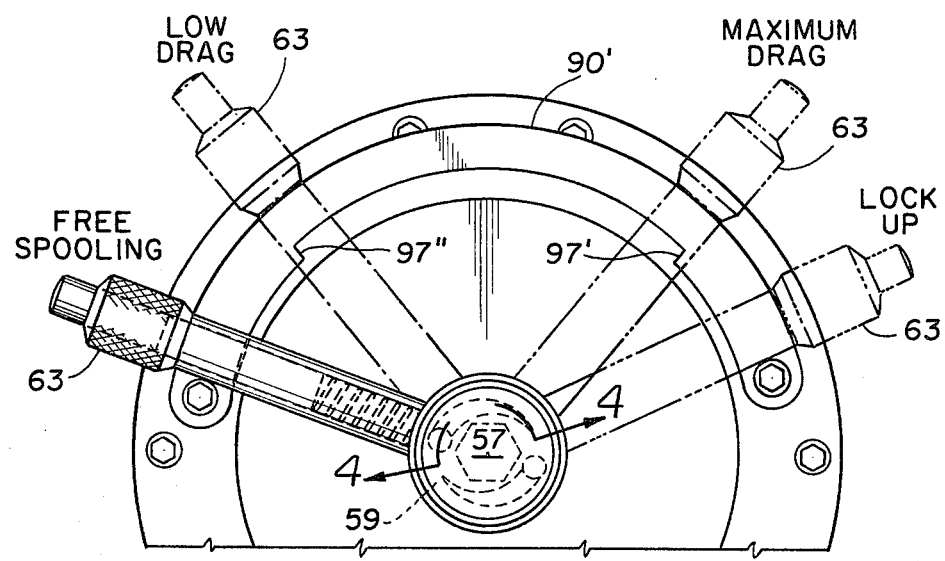
FIG. 3a is a view similar to FIG. 3 but showing an alternative embodiment.
Figure 4B:
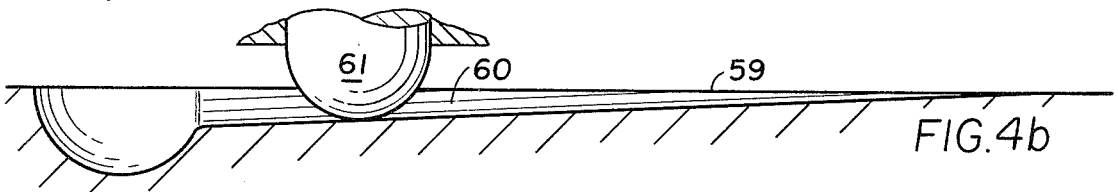
Figure 4C:
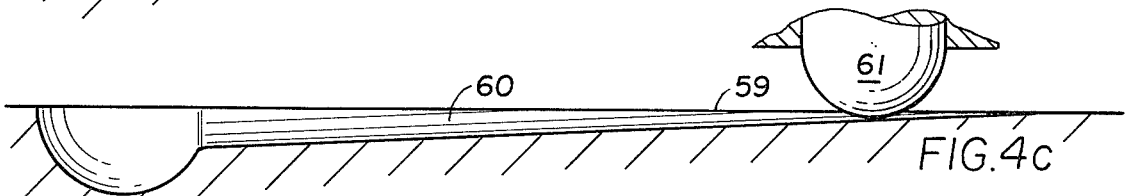
Figure 4D:
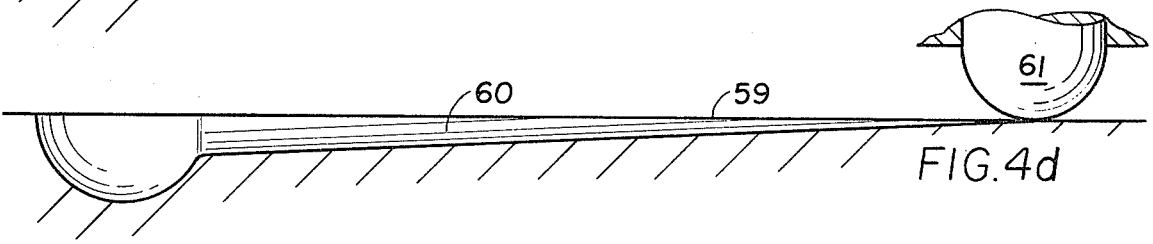

FIG. 3a shows a second embodiment, labelled 90', of the pressure adjustment lever guide 90 shown in FIGS. 3 and 1c. Guide 90' has projection 97' for stopping clockwise rotation of pressure adjustment lever 63 (as seen in FIG. 3a) at approximately ¼ of the length of guide 90' from the end of guide 90', and projection 97" for stopping counterclockwise rotation of pressure adjustment lever 63 (as seen in FIG. 3a) at approximately ¼ the length of guide 90' from the other end of guide 90'. Projection 97' functions in the same manner as projection 97 in the First Preferred Embodiment and is the position of pressure adjustment lever 63 for maximum drag. Projection 97" stops pressure adjustment lever 63 at a position of low drag; the level of low drag may not be adjusted independently of the maximum drag adjustment, but is roughly some fraction of the maximum drag, this fraction depending upon the stiffness of pressure disk spring 49 and the inclination of tapered cam button grooves 60. For example, the stiffness of pressure disk spring 49 will be selected so that a maximum drag setting of 20 pounds (achieved by turning adjustment nut 51 with pressure adjustment lever 63 stopped by projection 97') will yield a low drag of approximately 3 or 4 pounds when pressure adjustment lever 63 is stopped by projection 97". This low drag is to avoid override and backlash which can occur during free spooling. During the play of a fish, pressure adjustment lever 63 is manipulated between the maximum drag position and the low drag position; this provides a continuous variation of drag between these two extremes. For lock-up pin 94 is depressed so that projection 97' may be overriden, as described with the First Preferred Embodiment, and free spooling is achieved by depressing pin 94 to override projection 97". The position of cam buttons 61 in cam button grooves 60 for these different positions of pressure adjustment lever 63 are shown in FIGS. 4—4d: FIG. 4 shows the free spooling position; FIG. 4b shows low drag; FIG. 4c shows maximum drag; and FIG. 4d shows lock-up.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A fishing reel, comprising:
   (a) first and second housings secured together in a spaced relation,
   (b) a hollow drive shaft rotatably mounted between said housings,
   (c) a spool coaxially, rotatably, but axially non-slidably, mounted on said shaft drive,
   (d) a friction coupling for variable coupling of said spool and said drive shaft, said friction coupling comprising first and second parts, said first coupling part axially slidably, slightly tiltably, and non-rotatably mounted on said drive shaft and in opposed relation to said second coupling part which is affixed to said spool, said friction coupling adjacent said first housing,
   (e) a pressure adjuster for varying the coupling of said friction coupling by axial urging of said first coupling part along said drive shaft, said pressure adjuster mounted on said second housing, and
   (f) an operating connection between said pressure adjuster and said first coupling part, said operating connection including:
      (i) a plurality of pressure pins, each of said pressure pins slidably journalled through said first housing, having first and second ends, and oriented parallel to said drive shaft,
      (ii) a thrust bearing between and engaging said pressure pins' first ends and said first coupling part, said engagement of said pressure pins' first ends and said thrust bearing characterized by slidable and tiltable contacts of said pressure pins on said thrust bearing,
      (iii) a draw rod slidably extending through said hollow drive shaft and connected to said pressure adjuster adjacent to said second housing,
      (iv) an adjustment member threaded onto said draw rod adjacent to said first housing and extending to the exterior of said first housing for manipulation, and
      (v) an annular pressure disk spring having outer and inner boundaries, said pressure disk being between and engaging said pressue pins' second ends and said adjustment member, said engagement of said pressure pins' second ends and said pressure disk spring characterized by slidable and tiltable contacts of said pressure pins on said pressure disk spring near the outer boundary of said pressure disk spring, and said engagement of said pressure disk spring and said adjustment member characterized by slidable and tiltable contact of said adjustment member on the entire inner boundary of said pressure disk spring so that slight precession of said thrust bearing about the axis of said drive shaft causes axial oscillation of said pressure pins and similar precession of said pressure disk spring without disengaging any of said pressure pins' first ends from said thrust bearing, said pressure pins' second ends from said pressure disk spring, or said pressure disk spring inner boundary from said adjustment member.

2. The fishing reel of claim 1, wherein said pressure pins' ends are radiused so that said slidable and tiltable contacts have a smooth and continuously varying point of contact.

3. The fishing reel of claim 1, wherein said pressure pins are of sufficient number and spacing to avoid pressure warpage of said thrust bearing.

4. In a fishing reel of the type comprising a body, a spool rotatably supported in said body, a spool-driving and braking device including a friction coupling, an actuating device for actuating said friction coupling, the improvement wherein said actuating device comprises:

(a) a pressure adjustment lever containing a cavity and a lever aperture, said pressure adjustment lever mounted exteriorly on said body for manual manipulation, said aperture intersecting said cavity,
(b) a pin containing a pin aperture, said pin positioned in said cavity,
(c) an arcuate strip, said arcuate strip affixed to said body in a spaced relationship and passing through said lever and pin apertures,
(d) a yieldable member positioned in said cavity and urging said pin against said arcuate strip,
(e) at least one projection formed on said arcuate strip and positioned in the path of contact traced out by said pin on said arcuate strip as said pressure adjustment lever is manipulated, said projection of a shape for stopping manipulation of said pin and pressure adjustment lever in at least one direction and for permitting said pressure adjustment lever to pass beyond said stopping position by manual urging of said pin against said yieldable member and out of contact with said arcuate strip.

* * * * *